US012393345B2

(12) United States Patent
Morgan et al.

(10) Patent No.: US 12,393,345 B2
(45) Date of Patent: Aug. 19, 2025

(54) MAXIMUM ROW ACTIVE TIME ENFORCEMENT FOR MEMORY DEVICES

(71) Applicant: Micron Technology, Inc., Boise, ID (US)

(72) Inventors: Donald M. Morgan, Meridian, ID (US); Bryan David Kerstetter, Kuna, ID (US)

(73) Assignee: Micron Technology, Inc., Boise, ID (US)

( * ) Notice: Subject to any disclaimer, the term of this patent is extended or adjusted under 35 U.S.C. 154(b) by 54 days.

(21) Appl. No.: 18/405,998

(22) Filed: Jan. 5, 2024

(65) Prior Publication Data

US 2024/0231635 A1   Jul. 11, 2024

Related U.S. Application Data

(60) Provisional application No. 63/479,168, filed on Jan. 9, 2023.

(51) Int. Cl.
*G06F 3/06* (2006.01)
*G11C 11/406* (2006.01)

(52) U.S. Cl.
CPC .......... *G06F 3/0616* (2013.01); *G06F 3/0653* (2013.01); *G06F 3/0659* (2013.01); *G06F 3/0673* (2013.01); *G11C 11/40603* (2013.01)

(58) Field of Classification Search
CPC .......... G11C 11/4076; G11C 11/40622; G11C 11/4085; G11C 11/406; G11C 11/40603;

(Continued)

(56) References Cited

U.S. PATENT DOCUMENTS 10,838,869 B1 * 11/2020 Avron ................. G06F 12/0862
2004/0120210 A1 * 6/2004 Lee .......................... G11C 7/22
365/232

(Continued)

FOREIGN PATENT DOCUMENTS

JP       2006107330 A  *  4/2006

OTHER PUBLICATIONS

"Kibra DDR Protocol Analyzer Suite, User Manual", Nov. 2013, Teledyne Lecroy, Version 2.40, pp. 1-172 (Year: 2013).*

(Continued)

*Primary Examiner* — Curtis James Kortman
(74) *Attorney, Agent, or Firm* — Greenberg Traurig

(57) ABSTRACT

A system for providing maximum row active time enforcement for memory devices is disclosed. A host device issues an activate command to activate a memory bank of a plurality of memory banks of a memory. The memory device activates the memory bank and determines whether a precharge command to close the first memory bank has been issued by the host device within a maximum threshold amount of time since issuance of the activate command. If the system determines that the precharge command has been issued by the host device within the threshold, the memory device closes the memory bank via the host-issued precharge command. If, however, the system determines that the precharge command has not been issued by the host device within the threshold, the memory device internally issues a precharge command to close the memory bank to reduce potential data loss and other harmful effects to the memory device.

20 Claims, 6 Drawing Sheets

(58) Field of Classification Search
CPC . G11C 16/08; G11C 16/3427; G11C 16/3418; G06F 3/0623; G06F 3/0658; G06F 3/0659; G06F 3/0683; G06F 3/0616; G06F 3/0653; G06F 3/0679; G06F 21/79; G06F 21/566; G06F 2221/034
See application file for complete search history.

(56) References Cited

U.S. PATENT DOCUMENTS

| | | | |
|---|---|---|---|
| 2007/0121399 A1* | 5/2007 | Bains | G11C 7/22 365/203 |
| 2010/0070697 A1* | 3/2010 | Saito | H04N 1/32358 711/E12.001 |
| 2016/0070483 A1* | 3/2016 | Yoon | G06F 13/1694 711/154 |
| 2017/0316818 A1* | 11/2017 | Saifuddin | G11C 11/40622 |
| 2018/0293189 A1* | 10/2018 | Bacchus | G06F 13/1668 |

OTHER PUBLICATIONS

Haocong Luo et. al., "RowPress: Amplifying Read Disturbance in Modern DRAM Chips", ISCA '23 Proceedings of the 50th Annual Symposium on Computer Architecture, Article No. 28, pp. 1-18 (Year: 2023).*

* cited by examiner

MAXIMUM ROW ACTIVE TIME ENFORCEMENT FOR MEMORY DEVICES

RELATED APPLICATIONS

The present application claims priority to Prov. U.S. Pat. App. Ser. No. 63/479,168 filed Jan. 9, 2023, the entire disclosure of which application is hereby incorporated herein by reference.

FIELD OF THE TECHNOLOGY

At least some embodiments disclosed herein relate to memory devices in general, and more particularly, but not limited to, maximum row active time enforcement for memory devices.

BACKGROUND

Typically, a computing device or system includes one or more processors and one or more memory devices, such as memory chips or integrated circuits. The memory devices may be utilized to store data that may be accessed, modified, deleted, or replaced. The memory devices may be, for example, non-volatile memory devices that retain data irrespective of whether the memory devices are powered on or off. Such non-volatile memories may include, but are not limited to, read-only memories, solid state drives, and NAND flash memories. Additionally, the memory devices may be volatile memory devices, such as, but not limited to, dynamic or static random-access memories, which retain stored data while powered on, but are susceptible to data loss when powered off. Based on receipt of an input, the one or more processors of the computing device or system may request that a memory device of the computing system retrieve stored data associated with or corresponding to the input. In certain scenarios, the data retrieved from the memory device may include instructions, which may be executed by the one or more processors to perform various operations and may include data that may be utilized as inputs for the various operations. In instances where the one or more processors perform operations based on instructions from the memory device, data resulting from the performance of the operations may be subsequently stored into the memory device for future retrieval.

While current memory technologies provide for various functionality and benefits, situations often that arise that may potentially cause degradation to the memory devices, potential data loss, damage to memory cells of the memory devices, among other potential harmful effects to the memory devices. For example, a host device may issue an activate command to a memory device to activate a memory bank of the memory device. If, however, the memory bank is activated and opened for an extended period of time, a loss of data may occur due to insufficient refresh and the life of the memory device may be reduced. For emerging technologies, degradation to the memory device may occur that may permanently damage one or more memory cells of the memory device. In certain scenarios, malicious attacks may be intentionally conducted by hackers to damage the memory bank by taking actions to keep the memory bank open for an extended period of time. Based at least on the foregoing, providing functionality to effectively prevent or counteract such effects, will result in enhanced memory device life expectancy, enhanced memory device data storage capabilities, reduced memory damage, and improved memory device failure mitigation capabilities.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
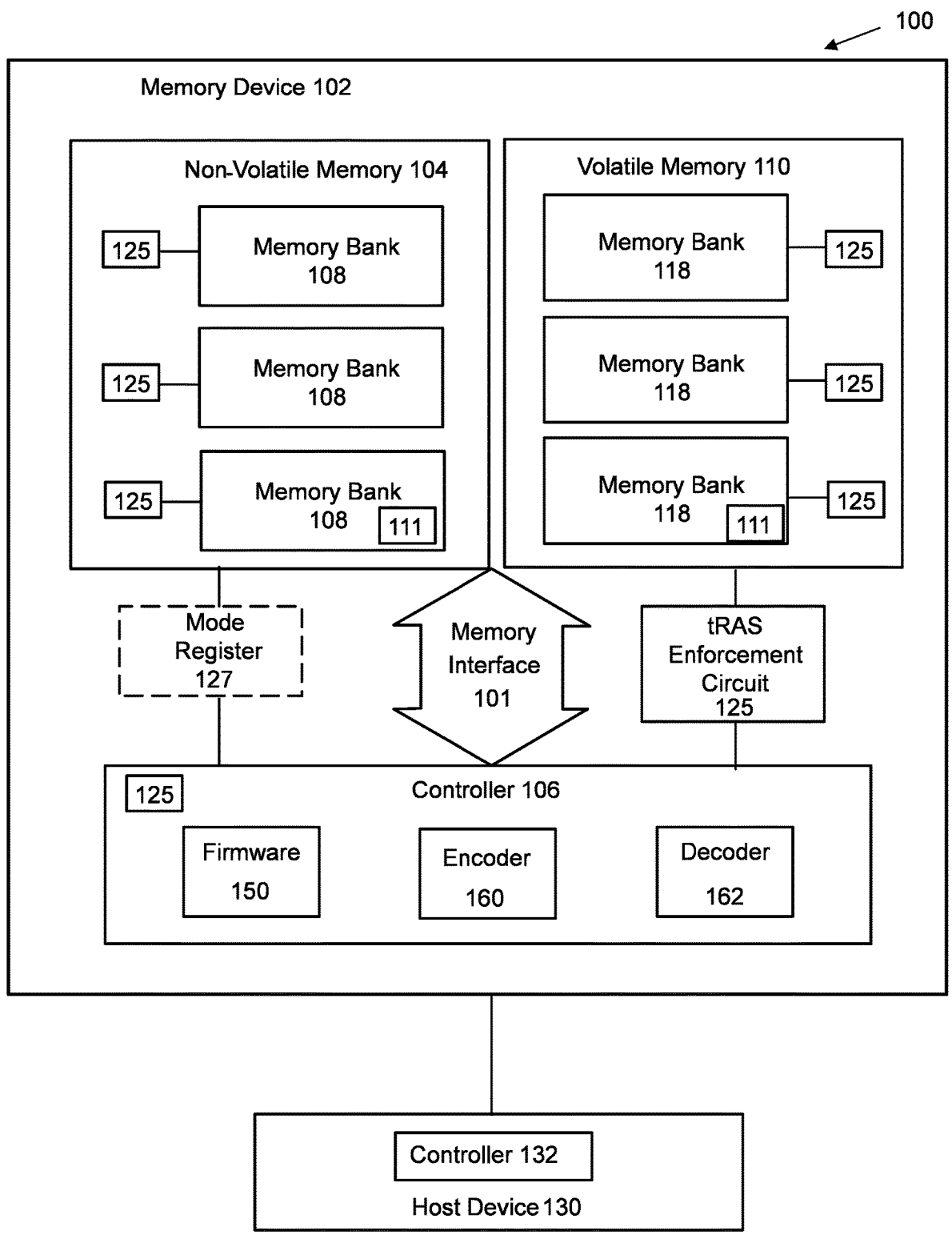
FIG. 1 illustrates a schematic diagram of a memory device and host device for providing maximum row active time enforcement for memory devices in accordance with embodiments of the present disclosure.

The following disclosure describes various embodiments for systems and methods for providing maximum row active time enforcement for memory devices. At least some embodiments of the present disclosure relate to memory device technologies for mitigating the effects and consequences of leaving a memory bank of a memory device open for extended periods of time. Additionally, at least some embodiments relate to memory device technologies for reducing potential data loss, memory degradation and leakage, static imprinting, and other deleterious effects on a memory device by effectively enforcing maximum row active times through the use of internal precharge commands issued by the memory device itself, such as when an expected precharge command external from the memory device does not arrive on time.

For a given memory bank within a memory device, a host device may issue an activate command to activate and open the memory bank so that it may be accessed by the host device. For example, the activate command may be utilized by a controller of a memory device to activate a specific row within the memory bank that is the target of the activate command issued by the host device. The host device may seek to read data from the row, modify data from the row, erase data from the row, perform other actions with respect to the data in the row, or a combination thereof. When a host device is done using the opened row, the host device may issue a precharge command to close the memory bank so that the memory bank may be prepared for a subsequent access by the host device, other device, or system. In certain scenarios, the host device may fail to issue the precharge command to the memory device, which may result in the memory bank being open for an extended period of time.

When a memory bank of a memory device is open for an extended period of time without issuance of a precharge command to close the memory bank, loss of data from memory banks of the memory device, static imprinting, memory cell degradation, permanent memory cell damage, and other harmful effects may occur. For example, loss of data may occur because of insufficient refresh conducted on the memory device as a result of the memory bank being open for an extended duration. In certain situations, the data loss may be on other rows of the memory bank that are not on the open row because the other rows may not have the opportunity to refresh.

To counteract such potential harmful effects from occurring to a memory device, the embodiments of the present disclosure including measuring the row active time (tRAS) for a memory bank of a memory device may be effective. In certain embodiments, the tRAS for a memory bank may be the amount of time between an activate command and a precharge command for the same memory bank. In certain embodiments, a maximum length of the tRAS (tRASmax) for a given memory device may be dependent upon the characteristics of the storage elements within the memory device. For example, the tRASmax (i.e., the maximum amount of time after activation of a memory bank or issuance of an activate command and an expected precharge command) may be set based on the type of memory elements, the storage capacity of the memory banks, the type of memory banks, the speed at which the memory device operates, the type of host device interacting with the memory device, any characteristic of the memory device, any characteristic of a host device, or a combination thereof. The tRASmax may be set to a threshold maximum value to mitigate cell leakage, degradation, data loss, and/or other harmful effects.

In certain memory devices, tRASmax violations may be identified through loss of data, however, in emerging memory technologies, data may persist with undetected cell degradation. In scenarios involving emerging memory technologies, the effect of cell degradation may not be immediately apparent, resulting in unintentional tRASmax violations that may cause a reduced lifetime for the memory device. Additionally, for emerging memory technologies, in a tRASmax attack, a hacker or malicious player may deliberately cause the tRASmax to be violated with the intent to destroy the memory device typically to bypass data security. To thwart such outcomes, the embodiments of the present disclosure provide a solution that delivers feedback that tRASmax has been violated, while providing mitigation for a tRASmax attack or other cause for a tRASmax violation.

To that end, the embodiments of the present disclosure determine whether a memory bank has not been precharged by the controller of a host device (or other device or system) at or after tRASmax. If the memory bank has not been precharged, the memory device may internally issue a precharge command (or other operation) to close the memory bank. In certain embodiments, if the tRASmax requirement is met, the memory device operation may not be altered. As a result, in certain embodiments, the internal precharge commands to close out a memory bank may be issued specifically when the tRASmax requirement is not met. In certain embodiments, the embodiments may include specifying an internal tRASmax value for tRASmax enforcement circuits of the memory device that are greater than what are specified for the memory device itself to provide a margin to reduce the likelihood of unexpected internal precharges from occurring. The functionality provided by the embodiments of the present disclosure provided feedback to a controller of a host device or other device that the tRASmax has been violated. Additionally, the functionality provided by the embodiments mitigate the possibility that a malicious player intentionally violates tRASmax to damage a memory device. Furthermore, the functionality provided by the embodiments, increase the reliability and lifetime of a memory device.

In certain embodiments, the embodiments include a circuit and methods to identify tRASmax violations in a memory device. In certain embodiments, in response to a tRASmax violation, an internal precharge command is issued to prevent a continued violation of tRASmax. Preventing the continued violation of tRASmax may minimize risk of memory device degradation. In certain embodiments, the circuits and methods may enable the memory device to provide feedback to the memory controller and/or to the host controller that the tRASmax requirement has not been met.

In certain embodiments, a system for providing maximum row active time enforcement is provided. In certain embodiments, the system may include a host device including a first controller and a memory device including a plurality of memory banks configured to store data and a second controller configured to receive an activate command issued by the first controller to activate a first memory bank of the plurality of memory banks. The second controller may be configured to activate, in response to the activate command, the first memory bank of the plurality of memory banks. The memory device may also include a circuit configured to determine whether a first precharge command to close the first memory bank has been issued by the first controller within a maximum threshold amount of time since issuance of the activate command issued by the first controller. Additionally, the circuit may be configured to internally issue, within the memory device, a second precharge command to close the first memory bank if the first precharge command from the first controller has not been issued within the maximum threshold amount of time since issuance of the activate command by the first controller.

In certain embodiments, the circuit of the system may be further configured to not issue the second precharge command if the first precharge command has been issued by the first controller within the maximum threshold amount of time since issuance of the activate command by the first controller. In certain embodiments, the circuit may be further configured to prevent loss of data for the first memory bank, other memory banks of the plurality of memory banks, or a combination thereof, based on issuance of the second precharge command to close the first memory bank. In certain embodiments, the second controller may be further configured to receive the first precharge command from the first controller of the host device and close the first memory bank based on the first precharge command. In certain embodiments, the second controller may be further configured to return the first memory bank to an idle state upon closing the first memory bank. In certain embodiments, the circuit may be further configured to select the maximum threshold amount of time based on at least one characteristic of the memory device.

In certain embodiments, the second controller may be further configured to facilitate identification of a malicious attack on the memory device if the first precharge command from the first controller has not been issued within the maximum threshold amount of time since issuance of the activate command by the first controller. In certain embodiments, the maximum threshold amount of time utilized for the circuit may be greater than a specified maximum threshold amount of time for the memory device to reduce a likelihood of unexpected internal precharges from occurring within the memory device. In certain embodiments, the second controller may be further configured to provide feedback to the first controller of the host device indicating a violation that the first precharge command from the first controller has not been issued within the maximum threshold amount of time since issuance of the activate command by the first controller.

In certain embodiments, the circuit of the memory device may further include an oscillator configured to generate periodic pulse signals and a counter configured to increment a first count value as each of the periodic pulse signals is generated by the oscillator. In certain embodiments, the circuit may be further configured to trap a second count value corresponding to a pulse signal of the periodic pulse signals occurring at a time of activation of the first memory bank in accordance with the activate command issued by the first controller. In certain embodiments, the circuit may be further configured to add a constant associated with the maximum threshold amount of time to the second count value trapped by the circuit to generate a sum, compare the first count value to the sum, and internally issue the second precharge command to close the first memory bank if the first count value is greater than or equal to the sum.

In certain embodiments, a method for providing maximum row active time enforcement is provided. The method may include activating, by utilizing a memory device, a first memory bank of a plurality of memory banks of the memory device based on an activate command issued by a host device. Additionally, the method may include calculating whether a maximum row active time has elapsed since receiving the activate command from the host device, wherein the maximum row active time is a maximum amount of time for receiving a first precharge command from the host device to close the first memory bank since receiving the activate command at the memory device. Furthermore, the method may include closing the first memory bank if the first precharge command from the host device is received at the memory device and the maximum row active time has not elapsed. Moreover, the method may include closing the first memory bank with a second precharge command generated internally by the memory device if the maximum row active time has elapsed.

In certain embodiments, the method may include counting, by utilizing a circuit of the memory device, a number of periodic pulse signals generated by an oscillator of the memory device since issuance of the activate command by the host device. In certain embodiments, the method may include, by utilizing the circuit of the memory device, issuing the second precharge command internally within the memory device if the number of periodic pulse signals counted indicates a time (e.g., since issuance) greater than or equal to the maximum row active time. In certain embodiments, the method may include setting the maximum row active time based on at least one characteristic associated with the memory device. In certain embodiments, the method may include facilitating entry of the first memory bank into an idle state based on the first precharge command or the second precharge command. In certain embodiments, the method may include providing a notification to the host device if the maximum row active time has elapsed.

In certain embodiments, a memory device that provides maximum row active time enforcement is provided. In certain embodiments, the memory device may include a plurality of memory banks configured to store data and a controller configured to receive an activate command issued by a host device to activate a first memory bank of the plurality of memory banks. In certain embodiments, the controller may also be configured to activate, in response to the activate command, the first memory bank of the plurality of memory banks. In certain embodiments, the memory device may be further configured to include a circuit configured to provide, by utilizing an oscillator of the circuit, pulse signals at a periodic interval. In certain embodiments, the circuit may be configured to increment a first count value as each of the pulse signals are provided by the oscillator. In certain embodiments, the circuit may be configured to trap a second count value corresponding to a first pulse signal of the pulse signals occurring at a time of activation of the first memory bank. In certain embodiments, the circuit may be configured to add a constant associated with a maximum row active time to the second count value to generate a sum. In certain embodiments, the circuit may be configured to compare the first count value to the sum. In certain embodiments, the circuit may be configured to issue an internal precharge command to close the first memory bank if the first count value is greater than or equal to the sum and a host precharge command has not been issued by the host device within the maximum row active time. In certain embodiments, the controller of the memory device may be configured to close the first memory bank if the host precharge command has been issued by the host device within the maximum row active time. Based on at least the foregoing capabilities provided by the embodiments of the present disclosure, memory device lifetimes may be enhanced, data loss may be reduced, static imprinting may be reduced, and potential permanent damage to the memory device may be prevented.

Referring now also to FIG. 1, FIG. 1 illustrates an exemplary architecture for a memory device 102 and host device 130 that may be utilized to provide maximum row active time enforcement in accordance with embodiments of the present disclosure. The memory device 102 and other componentry illustrated in the Figures may belong to a system 100. In certain embodiments, the memory device 102 is, for example, but not limited to, an SSD, eMMC, memory card, or other storage device, or a NAND-based flash memory chip or module that is capable of encoding and decoding stored data, such as by utilizing an encoder 160 and decoder 162 of the memory device 102. In certain embodiments, the memory device 102 may include any amount of componentry to facilitate the operation of the memory device 102. In certain embodiments, for example, the memory device 102 may include, but is not limited to including, a non-volatile memory 104, memory banks 108, a volatile memory 110, memory banks 118, a memory interface 101, a controller 106 (which, in certain embodiments, may include the encoder 160, a decoder 162, firmware 150, and/or other componentry), a mode register 127 (which may be optional), any number of row active time (tRAS) circuits 125, any other componentry, or a combination thereof. The memory device 102 may communicatively link with a host device 130, which may be or include a computer, server, processor, autonomous vehicle, any other computing device or system, or a combination thereof. In certain embodiments, the host device 130 may include a controller 132, which may be configured to control the operative functions of the host device 130, issue commands for the memory device 102, receive data from the memory device 102, modify data stored in the memory device 102, erase data on the memory device 102, perform other actions with respect to the memory device 102, or a combination thereof.

In certain embodiments, the non-volatile memory 104 may be configured to retain stored data irrespective of whether there is power delivered to the non-volatile memory 104. In certain embodiments, the non-volatile memory 104 may be configured to include any number of memory banks 108 that may be configured to store user data, any other type of data, or a combination thereof. In certain embodiments, the memory banks 108 may be activated and opened, such as upon receipt of an activate command from the host device 130 or other device. In certain embodiments, the memory banks 108 may be closed, such as upon receipt of a precharge command from the host device 130 or other device. In certain embodiments, the memory banks 108 of the non-volatile memory 104 may be configured to include a plurality of physical memory cells configured to store data. In certain embodiments, the non-volatile memory 104 may include a physical memory array including an array of bit cells, each of which may be configured to store a bit of data. In certain embodiments, each bit cell may be connected to a wordline and bitline. In certain embodiments, the memory cells of the non-volatile memory 104 may be etched onto the silicon wafer forming the base of the non-volatile memory. The memory cells may be etched in an array of columns (e.g., bitlines) and rows (e.g., wordlines). In certain embodiments, the intersection of a particular bitline with a wordline may serve as the address of the memory cell. In certain embodiments, for each combination of address bits, the memory device 102 may be configured to assert a wordline that activates the bit cells in a particular row of a memory bank 108. For example, in certain embodiments, when the wordline is high, the store bit may be configured to transfer to or from the bitline. On the other hand, in certain embodiments, when the wordline is not high, the bitline may be disconnected from the cell.

In certain embodiments, the memory banks 108 may include sense amplifiers 111, which may be configured to sense charges from the memory banks 108 and amplify the voltage to enable the host device 130 to interpret the data stored in a particular memory bank 108. In certain embodiments, each memory bank 108 may include or be communicatively linked with tRAS enforcement circuits 125, which may be utilized to determine whether a memory bank 108 has been opened beyond a maximum row active time (i.e., a maximum threshold amount of time since issuance of an activate command by a host device 130 or since activation of a memory bank 108 that is the target of the activate command) without being precharged by the host device 130 or other device. In certain embodiments, for example, if a row in a memory bank 108 has been opened beyond the maximum row active time allowed by the memory device 102, the memory device 102 may issue a precharge command to close the memory bank 108 to reduce potential harmful effects of leaving the memory bank opened for an extended period of time.

In certain embodiments, the volatile memory 110 may also be configured to retain stored data, however, in certain embodiments, may not retain the data after power is no longer provided to the volatile memory 110 or to the memory device 102. In certain embodiments, the volatile memory 110 may include a plurality of memory banks 118, which may be similarly activated and opened, such as upon receipt by the memory device 102 of an activate command. In certain embodiments, the memory banks 118 may include any of the componentry and/or functionality as for the memory banks 108. For example, the volatile memory 110 may include a physical memory array including an array of bit cells configured to store data. Bit cells in a particular row of a memory bank 118 may be activated in response to receipt of an activate command, such as issued by a host device 130. In certain embodiments, the memory banks 118 may include sense amplifiers 111, which may be configured to sense charges from the memory banks 118 and amplify the voltage to enable the host device 130 to interpret the data stored in a particular memory bank 118. In certain embodiments, each memory bank 118 may include or be communicatively linked with tRAS enforcement circuits 125, which may be utilized to determine whether a memory bank 118 has been opened beyond a maximum row active time (i.e., a maximum threshold amount of time since issuance of an activate command by a host device 130 or since activation of a memory bank 118 that is the target of the activate command) without being precharged by the host device 130 or other device.

In certain embodiments, the controller 106 of the memory device 102 may be configured to control access to the non-volatile memory 104, the volatile memory 110, any other componentry of the memory device 102, or a combination thereof. In certain embodiments, data may be provided by controller 106 to the non-volatile memory 104, the volatile memory 110, or a combination thereof, such as by utilizing memory interface 101. For example, the data may be obtained from the host device 130 to be stored in the non-volatile memory 104, such as in a memory bank 108. In certain embodiments, the controller 106 may include an encoder 160 for generating ECC data (e.g., such as when writing data to the non-volatile memory 104), and a decoder 162 for decoding ECC data (e.g., when reading data, such as from the non-volatile memory 104). In certain embodiments, the controller 106 may include firmware 150, which may be configured to control the components of the system 100. In certain embodiments, the firmware 150 may be configured to control access to the non-volatile memory 104, the volatile memory 110, or a combination thereof, by the host device 130 and control the operative functionality of the memory device 102. Further details relating to the firmware 150 are discussed below. In certain embodiments, the controller 106 may include or be communicatively linked to a tRAS enforcement circuit 125.

As indicated above, the memory device 102 may be configured to receive data (e.g., user data) to be stored from host device 130 (e.g., over a serial communications interface, or a wireless communications interface). In certain embodiments, the user data may be video data from a device of a user, sensor data from one or more sensors of an autonomous or other vehicle, text data, audio data, virtual reality data, augmented reality data, information, content, any type of data, or a combination thereof. In certain embodiments, memory device 102 may be configured to store the received data in memory cells of non-volatile memory 104, the volatile memory 110, or a combination thereof. In certain embodiments, the memory cells may be provided by one or more non-volatile memory chips, volatile memory chips, or a combination thereof. In certain embodiments, the memory chips may be NAND-based flash memory chips, however, any type of memory chips or combination of memory chips may also be utilized. In certain embodiments, the memory device 102 may be configured to store received data in volatile memory 110 (which may be any type of volatile memory) on a non-persistent basis. In certain embodiments, the volatile memory 110 may include componentry, such, as but not limited to, a physical memory array.

In certain embodiments the firmware 150 of the memory device 102 may be configured to control the operative functionality of the memory device 102. In certain embodiments, the firmware 150 may be configured to manage all operations conducted by the controller 106. In certain embodiments, the firmware 150 may be configured to activate a physical row in the memory banks 108, the memory banks 118, or a combination thereof, such as in response to receipt of an activate command by the host device 130. In certain embodiments, the firmware 150 may be configured to deactivate or close a physical row in the memory banks 108, the memory banks 118, or a combination thereof, such as if a precharge command is received from the host device 130, a precharge command is issued by the memory device 102 itself, or a combination thereof.

In certain embodiments, the memory device 102 may include a mode register 127. In certain embodiments, the mode register 127 may include any of the features and/or functionality of a mode register that may be utilized with a memory device, such as memory device 102. In certain embodiments, the mode register 127 may be utilized to set a bit within the mode register 127 when a violation of a maximum row active time occurs. In certain embodiments, another bit within the mode register 127 may be utilized to identify a cause for the violation. In certain embodiments, a further bit of the mode register 127 may be utilized to indicate whether a precharge command was issued by the host device 130, the memory device 102 itself, or a combination thereof. Notably, the system 100 including the memory device 102 may be utilized to support any of the functionality provided by the present disclosure.

Figure 2:
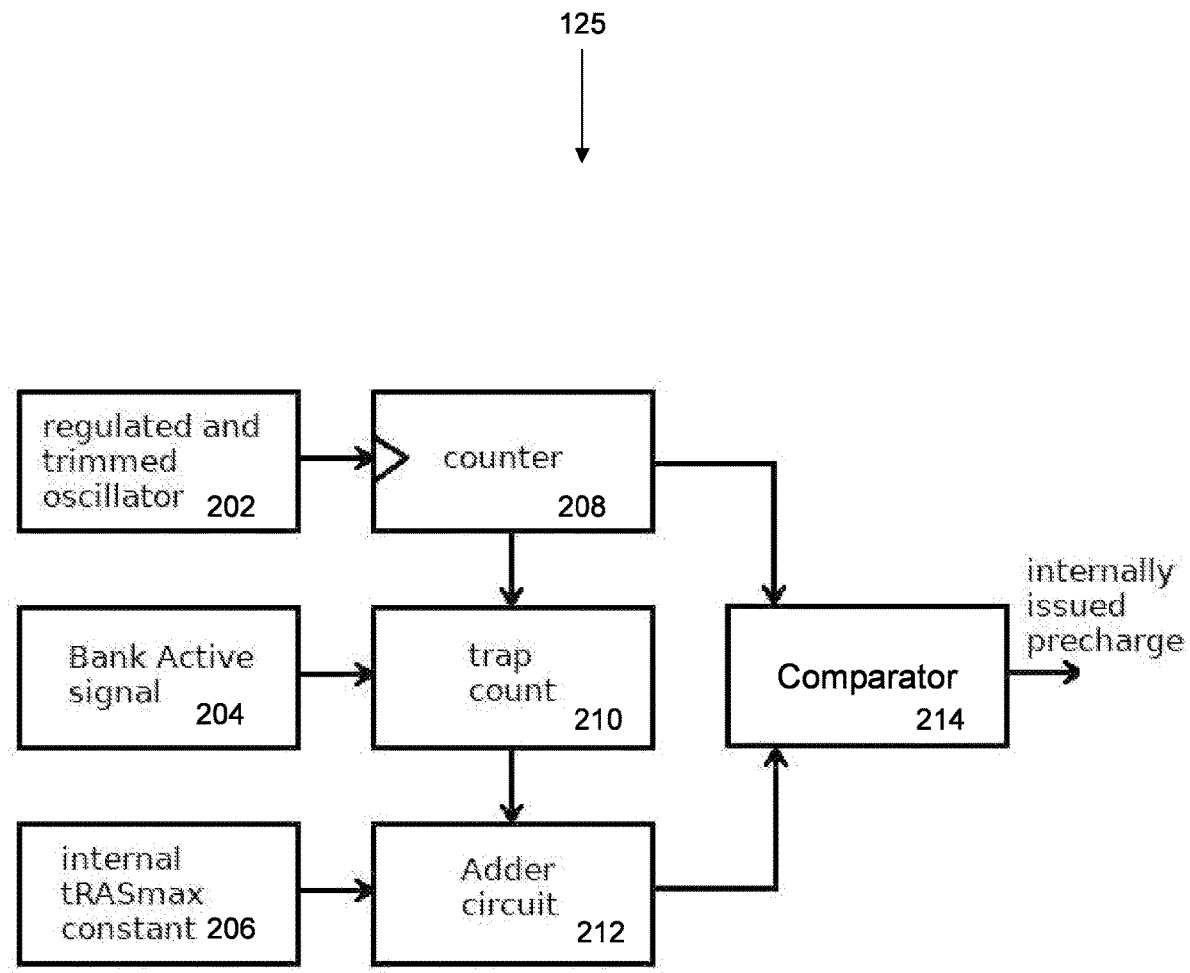
FIG. 2 illustrates a schematic diagram illustrating components and features of an exemplary circuit for use with a memory device to facilitate maximum row active time enforcement in accordance with embodiments of the present disclosure.

Referring now also to FIG. 2, a schematic diagram of an exemplary tRAS enforcement circuit 125 for use with the memory device 102 in accordance with embodiments of the present disclosure is shown. In certain embodiments, the tRAS enforcement circuit 125 may be configured to include any number of componentry. For example, in certain embodiments, the tRAS enforcement circuit 125 may be configured to include, but is not limited to including, an oscillator 202 (e.g., a regulated and trimmed oscillator), a counter 208, an adder circuit 212, a comparator 214, any other componentry, or a combination thereof. In certain embodiments, the oscillator 202 may be configured to generate pulse signals at periodic intervals and may serve as a clock for the memory device 102. In certain embodiments, the pulse signals may be utilized to generate an alternating waveform by converting current flow from a current source of the memory device 102. In certain embodiments, the counter 208 may be configured to count each of the pulse signals generated by the oscillator 202 continuously or over a period time to generate a first count value. When an activate command 204 (i.e., bank active signal) is received by the memory device 102 (or when the memory bank is activated in response to the activate command), such as from a host device 130, the count from the counter 208 may be trapped by the tRAS enforcement circuit 125 resulting in a trap count 210 (i.e., a second count value). In certain embodiments, the trapped count value 210 may correspond with or indicate the pulse signal count from the oscillator 202 that occurred at the time of activation of the memory bank. In certain embodiments, the trap count 210 may be conducted using latches that trap each bit or a number of bits of the counter 208 after issuance of the activate signal 204 or activation of the memory bank.

In certain embodiments, the first count value may be provided to a comparator 214 of the tRAS enforcement circuit 125, as shown in FIG. 2. In certain embodiments, such as if the tRAS enforcement circuit 125 is being used for multiple memory banks 108, 118, the trap count value 210 may be provided to an adder circuit 212 of the tRAS enforcement circuit 125 so that the trap count value 210 may be added to a constant associated with the maximum row active time (i.e., internal tRASmax constant 206). In certain embodiments, the adder circuit 212 may add the internal tRASmax constant 206 to the trap count value 210 and provide the result to the comparator 214. In certain embodiments, the comparator 214 may then compare the first count value provided by the counter 208 to the sum of the trap count value 210 and the internal tRASmax constant 206. In certain embodiments, if the first count value is greater than or equal to the sum of the trap count value 210 and the internal tRASmax constant 206, then the memory device 102 may issue a precharge command to close the memory bank that was opened via the activate command. In certain embodiments, the precharge command may be issued by the memory device 102 to close the memory bank if the host device 130 has not issued a precharge command as well. If, however, the first count value is less than the sum of the trap count value 210 and the internal tRASmax constant 206, the tRAS enforcement circuit 125 can continue counting using the counter 208 and increment the first count value until the first count value from the counter 208 is greater than or equal to the sum generated using the adder circuit 212. In certain embodiments, if a precharge command has already been issued by the host device 130, the tRAS enforcement circuit 125 may be bypassed since the memory bank has been closed. However, in certain embodiments, the tRAS enforcement circuit 125 may continue to operate despite the issuance of a precharge command by the host device 130, such as if the host device 130 issues another activate command after the precharge command.

In certain embodiments, such as if the tRAS enforcement circuit 125 is being utilized for multiple memory banks 108, 118, to reduce the size of the tRAS enforcement circuit 125, certain circuit elements of the tRAS enforcement circuit 125 may be shared among multiple memory banks 108, 118 and other circuit elements may be utilized with each individual memory bank 108, 118. For example, in certain embodiments, the regulated and trimmed oscillator 202, the counter 208, the trap count 210, the adder circuit 212, or a combination thereof, may be shared across multiple memory banks 108, 118, however, in certain embodiments, each individual memory bank 108, 118 may have its own individual and/or unique comparator 214. In such embodiments where the tRAS enforcement circuit 125 is being utilized for multiple memory banks 108, 118, the sum of the trap count value 210 and the internal tRASmax constant 206 may be stored in a per-bank latch for each of the memory banks 108, 118. In certain embodiments, each memory bank 108, 118 may have its own latched sum residing within a per-bank latch and each memory bank's 108, 118 corresponding comparator 214. In certain embodiments, an internally issued precharge may be issued to a memory bank 108, 118 if the first counter value of counter 208 becomes greater than or equal to the sum stored by the per-bank latch that stores the sum of the trap count value 210 and the internal tRASmax constant 206 for the particular memory bank 108, 118.

In certain embodiments, the tRAS enforcement circuit 125 may be simplified. For example, if each memory 104, 110 or even each memory bank 108, 110 has its own tRAS enforcement circuit 125, then the functionality and componentry of the tRAS enforcement circuit 125 may be simplified. In certain embodiments, for example, if the tRAS enforcement circuit 125 is utilized to enforce the maximum row active time for one memory bank 108, the tRAS enforcement circuit 125 may not need to utilize the internal tRASmax constant 206, the adder circuit 212, or a combination thereof. For example, in such a scenario, the tRAS enforcement circuit 125 may simply compare the count tallied by the counter 208 since issuance of an activate command (or since activation of the memory bank itself) and compare it to a maximum row active time specified for the memory bank 108 (or the memory device 102 in which it resides). If the count tallied is greater than the specified maximum row active time, the memory device 102 may internally issue a precharge command to close the memory bank.

Figure 3:
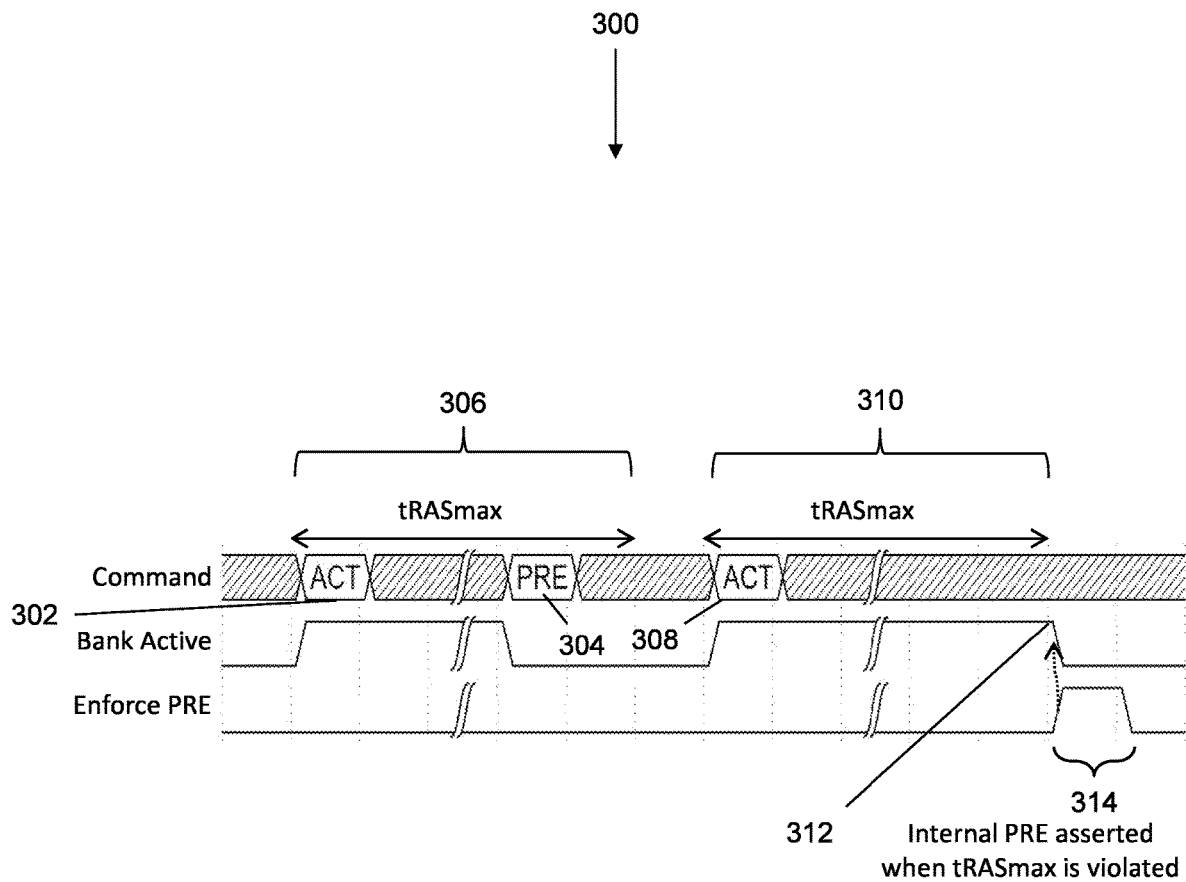
FIG. 3, illustrates an exemplary waveform diagram of maximum row active time enforcement in accordance with embodiments of the present disclosure.

Referring now also to FIG. 3, an exemplary waveform diagram 300 of maximum row active time enforcement in accordance with embodiments of the present disclosure is shown. In certain embodiments, the waveform diagram 300 may include waveforms for commands issued by the host device 130, the memory device 102, other devices, or a combination thereof. Additionally, in certain embodiments, the waveform diagram 300 may include waveforms that indicate when a memory bank of the memory device 102 is active or closed (i.e., inactive). In certain embodiments, the waveform diagram 300 may also include waveforms that indicate when a precharge command is enforced and issued, such as by utilizing a tRAS enforcement circuit(s) 125 of the memory device. In certain embodiments, the waveforms may be stacked on top of each other to show what occurs across all waveforms over time. Illustratively, for example, in the top portion of the waveform diagram 300, the command waveform is shown. The middle portion shows the bank active waveform, and the bottom portion shows the enforce precharge waveform.

In the command waveform, an activate command 302 is shown as being issued by a host device 130 at a particular time. Additionally, the command waveform illustrates when the precharge command is issued by the host device 130, at 304. In certain embodiments, the waveform diagram 300 may indicate the maximum row active time 306 for the memory device 102. Illustratively, for the first half of the waveform diagram, the precharge command 304 was issued by the host device 130 within the maximum row active time 306 designated for the memory device 102. The bank active waveform (i.e., the middle portion of the waveform diagram 300) illustrates when the memory bank is made active (i.e., opened) upon issuance of the active command 302 and when the memory bank is closed upon issuance of the precharge command by the precharge command 304. Illustratively, the bank active waveform shows the signal as being at 1 during activation of the memory bank and then dropping to 0 when the precharge command is issued by the host device 130. The precharge command enforcement waveform remains flat in the first half of the waveform diagram 300 because the precharge command 304 issued by the host device 130 was issued within the maximum row active time specified for the memory device 102.

However, in the second half of the waveform diagram 300, a violation of the maximum row active time is shown. For example, an activate command 308 is issued by a host device 130 (or other device). The bank active waveform spikes to 1 illustrating activation of the memory bank in response to receipt of the activation command by the memory device 102. The tRAS enforcement circuit 125 may track the time that has elapsed since issuance of the activation command 308 (or since opening the memory bank that is the target of the activation command 308) and compare the elapsed time to a maximum row active time 310. As shown in this scenario, the bank active waveform remains at 1 through the maximum row active time at 312. As a result, the memory device 102 issues an internal precharge command 314 since the maximum row active time was violated. The internal precharge command 134 is shown on the enforce precharge command waveform as being in the 1 position and the bank active waveform drops to 0 since the internal precharge command was issued to close the memory bank.

Figure 4:
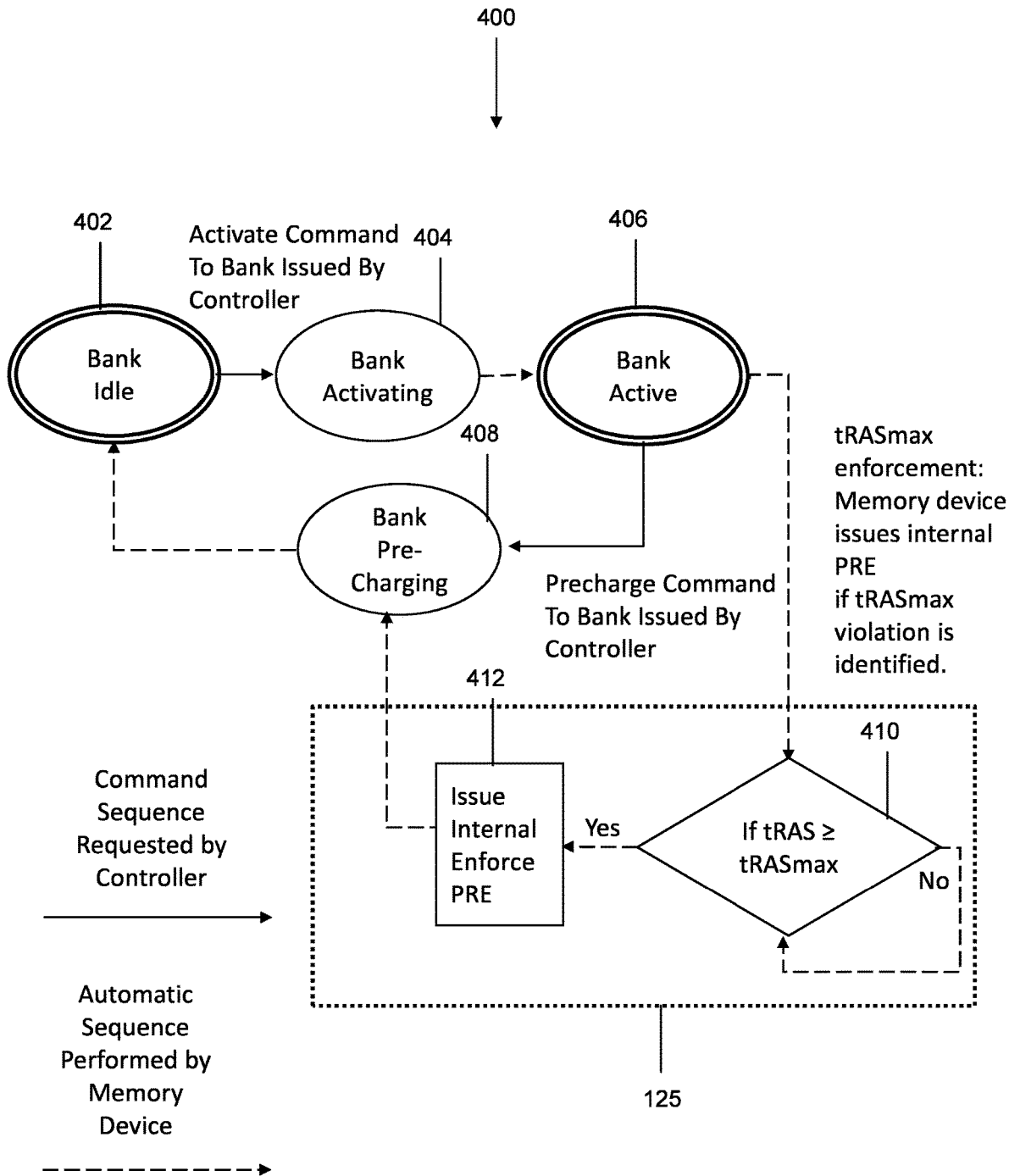
FIG. 4 illustrates an exemplary flow diagram providing maximum row active time enforcement for memory devices in accordance with embodiments of the present disclosure.

Referring now also to FIG. 4, FIG. 4 illustrates an exemplary flow 400 for providing maximum row active time enforcement for memory devices in accordance with embodiments of the present disclosure. In certain embodiments, the flow 400 may relate to conducting maximum time enforcement for a memory device 102 including a plurality of memory banks 108, 118. At 402, the flow 400 may include having a memory bank (e.g., a memory bank 108 or 118) be in an idle state. Then, the flow 400 may include having at 404, a host device 130, such as by utilizing controller 132, issue an activate command to activate the memory bank, such as to activate a specific row within the memory bank that contains data to be accessed, erased, modified, and/or read. In certain embodiments, at 406, the memory bank that is the target of the activate command may be activated based on the activate command. For example, the activate command may be a row access command that may include opening up a target row and causing charge from capacitors associated with the row into sense amplifiers 111 so that the data contained in the row may be accessed and/or interpreted by the controller 132 of the host device 130.

At 408, the flow 400 may include having the host device 130 issue a precharge command to close the memory bank after the memory bank was activated with the activate command. For example, the controller 132 of the host device 130 may issue the precharge command after access or modifying data in the row of the memory bank that was activated. The precharge command may be utilized to close the row so that the row may be ready for a subsequent access at a future time. Once the memory bank is precharged, the memory bank may re-enter the idle state at 402 and the flow 400 may continue accordingly. If, however, the precharge command has not been issued by the host device 130, the memory device itself may be configured to issue a precharge command internally within the memory device to reduce the probability of data loss, memory degradation, static imprinting in the memory bank, and other potentially harmful effects. For example, once the activate command is issued at 404, the tRAS enforcement circuit(s) 125, at 410, may be configured to determine whether the row active time (i.e., the time since the memory bank activation or issuance of the activate command by the host device 130, in certain embodiments) has exceeded a designated maximum row active time for the memory device 102, the memory bank 108 (or 118), or a combination thereof.

If the row active time for the row of the activated memory bank is less than the maximum row active time, the tRAS enforcement circuit(s) 125 may continue to count or track the time since the activation of the memory bank (or issuance of the activate command) until the row active time is greater than or equal to the maximum row active time designated for the memory bank 108 (or 118), the memory device 102, or a combination thereof. If the row active time measured by the tRAS enforcement circuit(s) 125 is greater than or equal to the maximum row active time specified, the memory device 102 may issue an internal precharge command at 412. In certain embodiments, the tRAS enforcement circuit 125 may be configured to issue the command, however, in certain embodiments, the controller 106 of the memory device 102 may issue the precharge command to close the open memory bank. By utilizing the memory device 102 to issue a precharge command when the row active time is greater than or equal to the maximum row active time, memory degradation, data loss, static imprinting, and other harmful effects to the memory device 102 and memory banks 108 (or 118) may be reduced or eliminated. Once the precharge command is issued by the memory device 102, the memory bank may be closed, and the memory bank may return to the idle state at 402. In certain embodiments, the flow 400 may be repeated as necessary or may run periodically, continuously, or at selected intervals.

Figure 5:
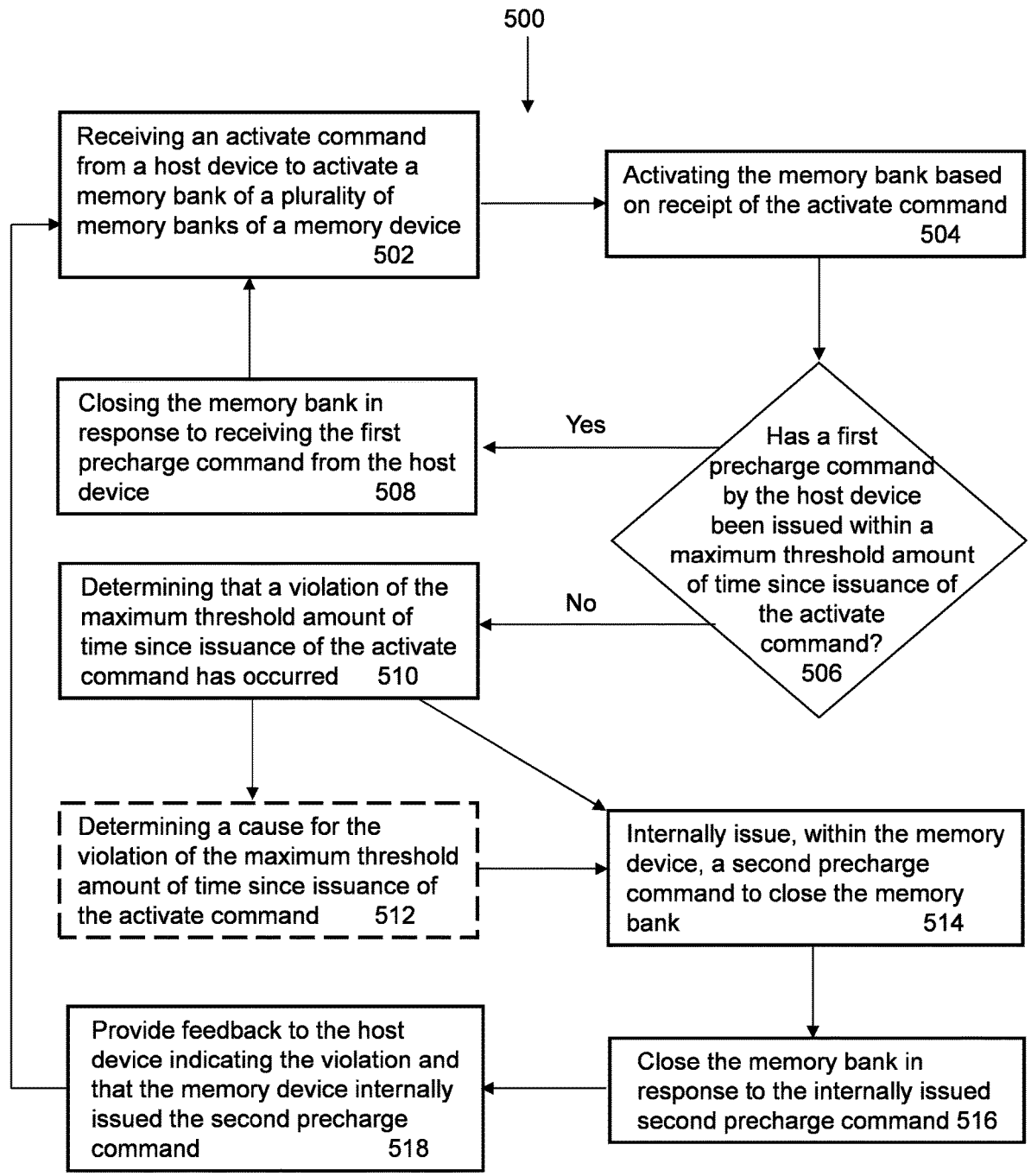
FIG. 5 illustrates a method for providing maximum row active time enforcement for memory devices in accordance with embodiments of the present disclosure.

Referring now also to FIG. 5, FIG. 5 illustrates an exemplary method 500 for providing maximum row active time enforcement for memory devices according to embodiments of the present disclosure. For example, the method of FIG. 5 can be implemented in the system 100 of FIG. 1 and any of the other systems or devices illustrated in the Figures or otherwise. In certain embodiments, the method of FIG. 5 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 5 may be performed at least in part by one or more processing devices (e.g., controller 106 of FIG. 1), the tRAS enforcement circuit(s) 125, the memory banks 108, 118, the mode register 127, the memory interface 101, the host device 130, or a combination thereof. Although shown in a particular sequence or order, unless otherwise specified, the order of the processes may be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 500 may include steps for providing maximum row active time enforcement according to various embodiments of the present disclosure. In certain embodiments, the method 500 may be performed by utilizing the system 100, by utilizing any combination of the componentry contained therein, any of the components, systems, and/or programs described herein and/or in the Figures, or a combination thereof. At step 502, the method 500 may include receiving an activate command from a host device to activate a memory bank of a plurality of memory banks of a memory device. For example, the host device 130 may issue an activate command to open a first memory bank of a plurality of memory banks (e.g., a memory bank 108 or memory 118) of the memory device 102. In certain embodiments, for example, the host device 130 may issue the activate command so that data stored in the first memory bank may be accessed by the host device 130, so that data may be written to the first memory bank, so that any other operation is conducted with respect to the first memory bank, or a combination thereof. In certain embodiments, the activate command may be utilized to activate a specific row within a memory bank comprising any number of rows and columns for storing data. In certain embodiments, the receiving and/or issuance of the activate command may be performed and/or facilitated by utilizing the host device 130, the memory device 102, the memory banks 108, 118, the memory interface 101, the controller 106, the mode register 127, any combination thereof, or by utilizing any other appropriate program, network, system, or device.

At step 504, the method 500 may include activating the memory bank in response to receiving the activate command. In certain embodiments and as mentioned herein, the activate command may be utilized to open and access a row of a memory bank (e.g., memory bank 108). For example, the activate command may be utilized to activate and open a row in the memory bank and transfer a charge from an associated capacitor(s) into a sense amplifier 111 of the memory device 102. In certain embodiments, the sense amplifier 111 may be configured to sense the charge associated with the open row that represents stored data bits (e.g., 1s and/or 0s) and amplify the voltage to enable the host device 130 to interpret the data outside the confines of the memory device 102. In certain embodiments, the activating of the memory bank may be performed and/or facilitated by utilizing the host device 130, the memory device 102, the memory banks 108, 118, the memory interface 101, the controller 106, the mode register 127, any combination thereof, or by utilizing any other appropriate program, network, system, or device.

At step 506, the method 500 may include determining whether a first precharge command by the host device 130 (i.e., a host precharge command) has been issued within a maximum threshold amount of time (i.e., the maximum row active time) since issuance of the activate command (or, in certain embodiments, since activation of the memory bank). In certain embodiments, the maximum threshold amount of time or maximum row active time may be the amount of time between an activate command and a precharge command for the same memory bank. In certain embodiments, the maximum threshold amount of time or maximum row active time may be the amount of time between activation of a memory bank and receipt of a precharge command for the same memory bank. In certain embodiments, the maximum threshold amount of time or maximum row active time may be the amount of time between activation of a memory bank and issuance of a precharge command for the same memory bank. In certain embodiments, the steps of the method 500 may be adapted accordingly based on the maximum threshold amount of time or maximum row active time used. In certain embodiments, the determination may be conducted by utilizing the tRAS circuit(s) 125. In certain embodiments, the determining of whether the first precharge command by the host device 130 has been issued within the maximum threshold amount of time may be performed and/or facilitated by utilizing the host device 130, the memory device 102, the memory banks 108, 118, the memory interface 101, the controller 106, the mode register 127, any combination thereof, or by utilizing any other appropriate program, network, system, or device.

At step 508, the method 500 may include closing the memory bank in response to receiving the first precharge command if it is determined at step 506 that the first precharge command was issued by the host device 130 within the maximum threshold amount of time (i.e., the maximum row active time). In certain embodiments, a precharge command may be utilized to deactivate a row currently open in a memory bank. For example, when a precharge command is issued, the memory device may restore values read from the capacitors of the row of the memory bank (e.g., memory banks 108, 118). The restoration of the values may be facilitated by utilizing the sense amplifier(s) 111. Once the values for the row are restored, the memory bank within which the row is located may be ready for another subsequent row access that may be initiated via a new activate command, such as from the host device 130. In certain embodiments, the closing of the memory bank based on the first precharge command issued by the host device 130 may be performed and/or facilitated by utilizing the host device 130, the memory device 102, the memory banks 108, 118, the memory interface 101, the controller 106, the mode register 127, any combination thereof, or by utilizing any other appropriate program, network, system, or device. In certain embodiments, the method 500 may then proceed to step 502 and repeat the steps of the method 500.

If, however, at step 506, it is determined that the first precharge command was not issued by the host device 130 within the maximum threshold amount of time (i.e., the maximum row active time), the method 500 may proceed to step 510. At step 510, the method 500 may include determining that a violation of the maximum threshold amount of time has occurred. For example, the violation of the maximum threshold amount of time may be since issuance of the activate command issued by the host device 130. In certain embodiments, the determination of the violation may be performed and/or facilitated by utilizing the host device 130, the memory device 102, the memory banks 108, 118, the memory interface 101, the controller 106, the mode register 127, any combination thereof, or by utilizing any other appropriate program, network, system, or device. In certain embodiments, the method 500 may proceed directly to step 514, however, in certain embodiments, the method 500 may proceed to optional step 512.

At step 512, the method 500 may include determining or identifying the cause for the violation of the maximum threshold amount of time since issuance of the activate command. For example, in certain embodiments, the system 100, such as via the memory device 102 or other device, may determine that a hacker performed actions to prevent a precharge command from being issued by the host device 130. If the hacker took control of the host device 13, the hacker may have taken an action to try to damage the memory device 102 keeping the memory bank open to try to damage the memory device 102. In certain embodiments, for example, the memory device 102 componentry may detect leaking charges from memory cells of the memory banks 108, 110, that data has been unexpectedly changed in neighboring rows of the memory bank 108, 110 not addressed by the activate command or otherwise, and/or other evidence of hacking to determine the cause for the violation. In certain embodiments, the memory device 102 may identify that the host device 102 may have malfunctioned, is down, is preoccupied, or otherwise unavailable to issue a precharge command. For example, the memory device 102 may receive a notification from the host device 130 itself indicating a cause for the violation (e.g., malfunction, etc.), the memory device 102 may transmit a signal to ping the host device 130 and not receive a response back from the host device 130, perform other actions to facilitate identification of the cause for the violation, or a combination thereof. In certain embodiments, the identification of the cause for the violation may be performed and/or facilitated by utilizing the host device 130, the memory device 102, the memory banks 108, 118, the memory interface 101, the controller 106, the mode register 127, any combination thereof, or by utilizing any other appropriate program, network, system, or device.

At step 514, whether from step 510 or step 512, the method 500 may include internally issuing a second precharge command (i.e., a memory device issued precharge command that may be a first precharge command issued by the memory device) internally within the memory device 102 to close the open memory bank 108, 118. In certain embodiments, the issuance of the internal precharge command may be performed by utilizing the tRAS enforcement circuit 125, the memory device 102, the memory banks 108, 118, the memory interface 101, the controller 106, the mode register 127, any combination thereof, or by utilizing any other appropriate program, network, system, or device. At step 516, the method 500 may include closing the memory bank in response to the internally issued precharge command. In certain embodiments, the closing of the memory bank may be performed and/or facilitated by utilizing the tRAS enforcement circuit 125, the memory device 102, the memory banks 108, 118, the memory interface 101, the controller 106, the mode register 127, any combination thereof, or by utilizing any other appropriate program, network, system, or device. At step 518, the method 500 may include providing feedback to the host device 130 indicating the violation, what caused the violation, that the memory device internally issued the precharge command, any other information generated by the system 100, or a combination thereof. In certain embodiments, the providing of the feedback may be performed and/or facilitated by utilizing the host device 130, the memory device 102, the memory banks 108, 118, the memory interface 101, the controller 106, the mode register 127, any combination thereof, or by utilizing any other appropriate program, network, system, or device. Notably, the method 500 may be repeated as desired and may incorporate any of the other functionality of the present disclosure and is not limited to the specific sequences of steps provide herein.

Figure 6:
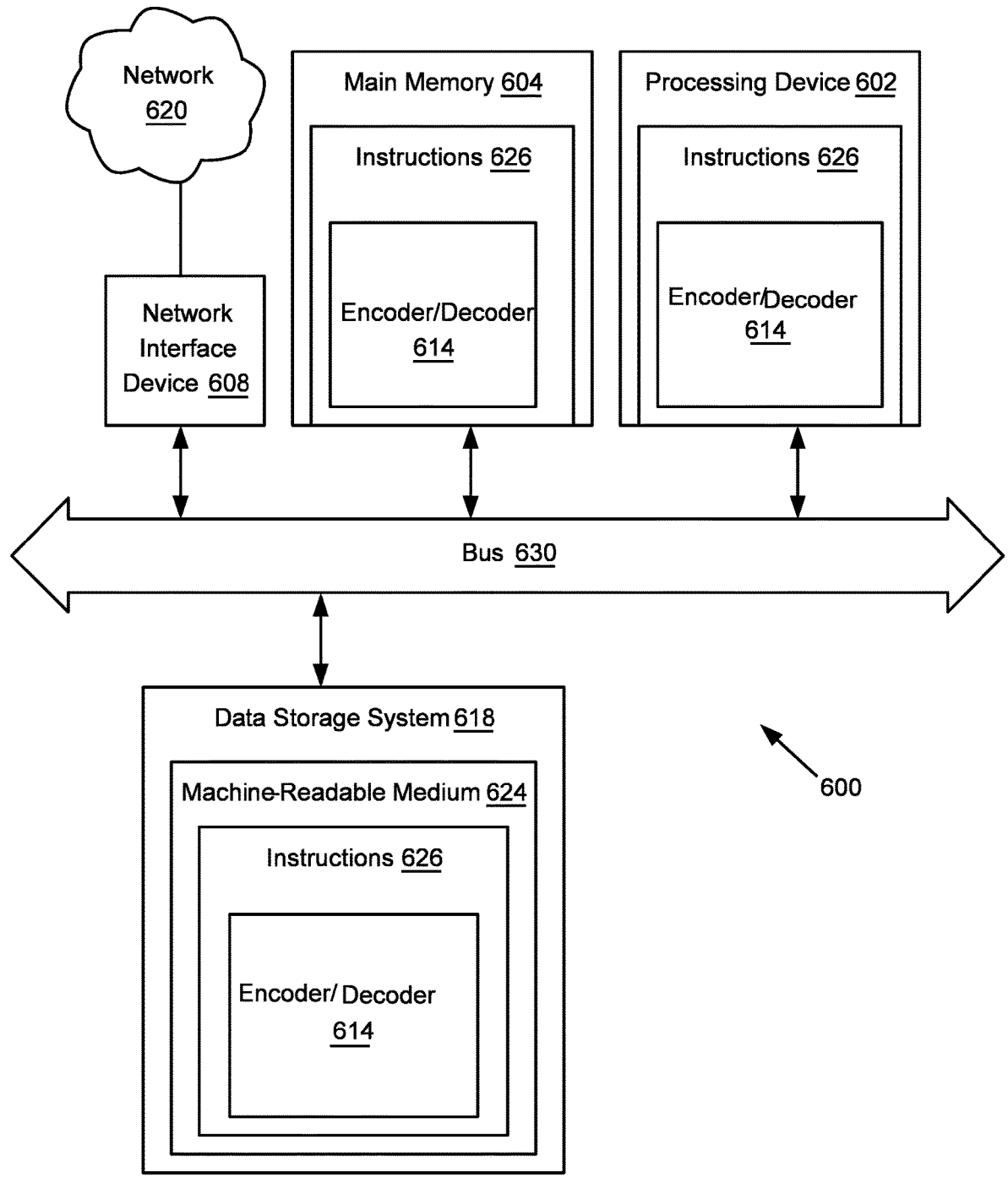
FIG. 6 illustrates a schematic diagram of a machine in the form of a computer system within which a set of instructions, when executed, may cause the machine to facilitate functionality supporting maximum row active time enforcement for memory devices according to embodiments of the present disclosure.

FIG. 6 illustrates an exemplary machine of a computer system 600 within which a set of instructions, for causing the machine to perform any one or more of the methodologies discussed herein, can be executed. In certain embodiments, the computer system 600 can correspond to a host system or device (e.g., the host device 130 of FIG. 1) that includes, is coupled to, or utilizes a memory system (e.g., the memory device 102 of FIG. 1). In certain embodiments, computer system 600 corresponds to memory device 102, host device 130, or a combination thereof. In certain embodiments, the machine may be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. In certain embodiments, the machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In certain embodiments, the exemplary computer system 600 may include a processing device 602, a main memory 604 (e.g., read-only memory (ROM), flash memory, dynamic random-access memory (DRAM) such as synchronous DRAM (SDRAM) or Rambus DRAM (RDRAM), static random-access memory (SRAM), etc.), and/or a data storage system 618, which are configured to communicate with each other via a bus 630 (which can include multiple buses). In certain embodiments, processing device 602 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. In certain embodiments, the processing device 402 may also be one or more special-purpose processing devices such as an application specific integrated circuit (ASIC), a field programmable gate array (FPGA), a digital signal processor (DSP), network processor, or the like.

The processing device 602 is configured to execute instructions 626 for performing the operations and steps discussed herein. For example, the processing device 602 may be configured to perform steps of flow 400 and the method 500 and support functionality provided by the system 100. For example, in certain embodiments, the computer system 600 may be configured to assist in receiving an activate command from a host device or controller, activating one or more memory banks of a memory device in response to receipt of the activate command, setting the maximum threshold amount of time (i.e., maximum row active time) based on characteristics of the memory device (or other devices, systems, programs, etc.), determining whether a precharge command has been issued by the host device within the maximum threshold amount of time (i.e., the maximum row active time), closing a bank based on a precharge command issued by the host device, issuing an internal precharge command within the memory device to close the bank if the host device has not issued the precharge command within the maximum threshold amount of time, performing any other operations as described herein, or a combination thereof. As another example, in certain embodiments, the computer system 600 may assist with conducting the operative functionality of the controller 106, the tRAS enforcement circuit(s) 125, the mode register 127, the non-volatile memory 104, the volatile memory 110, the memory device 102, the host device 130, or a combination thereof. In certain embodiments, computer system 600 may further include a network interface device 608 to communicate over a network 620.

The data storage system 618 can include a machine-readable storage medium 624 (also referred to as a computer-readable medium herein) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory device 102, or a combination thereof.

Reference in this specification to "one embodiment" "an embodiment" or "certain embodiments" may mean that a particular feature, structure, or characteristic described in connection with the embodiment is included in at least one embodiment of the disclosure. The appearances of the phrases "in one embodiment" and "in certain embodiments" in various places in the specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments, but not other embodiments.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
   a host device comprising a first controller; and
   a memory device comprising:
   a plurality of memory banks configured to store data;
   a second controller configured to:
      receive an activate command issued by the first controller to activate a first memory bank of the plurality of memory banks;
      activate, in response to the activate command, the first memory bank of the plurality of memory banks; and
   a circuit configured to:
      determine whether a first precharge command to close the first memory bank has been issued by the first controller within a maximum threshold amount of time since issuance of the activate command issued by the first controller; and
      internally issue, within the memory device, a second precharge command to close the first memory bank if the first precharge command from the first controller has not been issued within the maximum threshold amount of time since issuance of the activate command by the first controller.

2. The system of claim 1, wherein the circuit is further configured to not issue the second precharge command if the first precharge command has been issued by the first controller within the maximum threshold amount of time since issuance of the activate command by the first controller.

3. The system of claim 1, wherein the circuit is further configured to prevent loss of data for the first memory bank, other memory banks of the plurality of memory banks, or a combination thereof, based on issuance of the second precharge command to close the first memory bank.

4. The system of claim 1, wherein the second controller is further configured to:
   receive the first precharge command from the first controller of the host device; and
   close the first memory bank based on the first precharge command.

5. The system of claim 4, wherein the second controller is further configured to return the first memory bank to an idle state upon closing the first memory bank.

6. The system of claim 1, wherein the circuit is further configured to select the maximum threshold amount of time based on at least one characteristic of the memory device.

7. The system of claim 1, wherein the second controller is further configured to facilitate identification of a malicious attack on the memory device if the first precharge command from the first controller has not been issued within the maximum threshold amount of time since issuance of the activate command by the first controller.

8. The system of claim 1, wherein the maximum threshold amount of time utilized for the circuit is greater than a specified maximum threshold amount of time for the memory device to reduce a likelihood of unexpected internal precharges from occurring within the memory device.

9. The system of claim 1, wherein the second controller is further configured to provide feedback to the first controller of the host device indicating a violation that the first precharge command from the first controller has not been issued within the maximum threshold amount of time since issuance of the activate command by the first controller.

10. The system of claim 1, wherein the circuit further comprises:
an oscillator configured to generate periodic pulse signals; and
a counter configured to increment a first count value as each of the periodic pulse signals is generated by the oscillator.

11. The system of claim 10, wherein the circuit is further configured to:
trap a second count value corresponding to a pulse signal of the periodic pulse signals occurring at a time of activation of the first memory bank in accordance with the activate command issued by the first controller.

12. The system of claim 11, wherein the circuit is further configured to:
add a constant associated with the maximum threshold amount of time to the second count value trapped by the circuit to generate a sum;
compare the first count value to the sum; and
internally issue the second precharge command to close the first memory bank if the first count value is greater than or equal to the sum.

13. A method comprising:
activating, by utilizing a memory device, a first memory bank of a plurality of memory banks of the memory device based on an activate command issued by a host device;
calculating whether a maximum row active time has elapsed since receiving the activate command from the host device, wherein the maximum row active time is a maximum amount of time for receiving a first precharge command from the host device to close the first memory bank since receiving the activate command at the memory device;
closing the first memory bank if the first precharge command from the host device is received at the memory device and the maximum row active time has not elapsed; and
closing the first memory bank with a second precharge command generated internally by the memory device if the maximum row active time has elapsed.

14. The method of claim 13, further comprising counting, by utilizing a circuit of the memory device, a number of periodic pulse signals generated by an oscillator of the memory device since issuance of the activate command by the host device.

15. The method of claim 14, further comprising, by utilizing the circuit of the memory device, issuing the second precharge command internally within the memory device if the number of periodic pulse signals counted indicates that a time since receiving the activate command is greater than or equal to the maximum row active time.

16. The method of claim 13, further comprising setting the maximum row active time based on at least one characteristic associated with the memory device.

17. The method of claim 13, further comprising facilitating entry of the first memory bank into an idle state based on the first precharge command or the second precharge command.

18. The method of claim 13, further comprising providing a notification to the host device if the maximum row active time has elapsed.

19. A memory device comprising:
a plurality of memory banks configured to store data;
a controller configured to:
receive an activate command issued by a host device to activate a first memory bank of the plurality of memory banks; and
activate, in response to the activate command, the first memory bank of the plurality of memory banks; and
a circuit configured to:
provide, by utilizing an oscillator of the circuit, pulse signals at a periodic interval;
increment a first count value as each of the pulse signals are provided by the oscillator;
trap a second count value corresponding to a first pulse signal of the pulse signals occurring at a time of activation of the first memory bank;
add a constant associated with a maximum row active time to the second count value to generate a sum;
compare the first count value to the sum; and
issue an internal precharge command to close the first memory bank if the first count value is greater than or equal to the sum and a host precharge command has not been issued by the host device within the maximum row active time.

20. The memory device of claim 19, wherein the oscillator, the second count value, a counter associated with incrementing the first count value, an adder circuit associated with adding the constant to the second count value, or a combination thereof, are shared across the plurality of memory banks, wherein the first memory bank has a corresponding first memory bank comparator configured to compare the first count value to the sum, wherein the sum of the second count value with the constant is stored in a first memory bank latch of the first memory bank, and wherein the internal precharge command is issued to the first memory bank if the first count value is greater than or equal to the sum stored by the first memory bank latch.

* * * * *